US009920157B2

(12) United States Patent
Köcher et al.

(10) Patent No.: US 9,920,157 B2
(45) Date of Patent: Mar. 20, 2018

(54) ALKOXYSILANE-TERMINATED PREPOLYMER BASED ON POLYETHER CARBONATE POLYOLS, FOR SPRAY FOAMS

(71) Applicant: Bayer MaterialScience AG, Monheim am Rhein (DE)

(72) Inventors: Jürgen Köcher, Langenfeld (DE); Ute Nattke, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 116 days.

(21) Appl. No.: 14/437,100

(22) PCT Filed: Oct. 23, 2013

(86) PCT No.: PCT/EP2013/072129
§ 371 (c)(1),
(2) Date: Apr. 20, 2015

(87) PCT Pub. No.: WO2014/064133
PCT Pub. Date: May 1, 2014

(65) Prior Publication Data
US 2015/0284499 A1    Oct. 8, 2015

(30) Foreign Application Priority Data

Oct. 24, 2012  (EP) .................................... 12189728

(51) Int. Cl.
| | |
|---|---|
| C08G 18/10 | (2006.01) |
| C08G 18/48 | (2006.01) |
| C08G 18/71 | (2006.01) |
| C08G 18/77 | (2006.01) |
| C08G 18/12 | (2006.01) |
| C08G 18/28 | (2006.01) |
| C08G 18/38 | (2006.01) |
| C08G 18/42 | (2006.01) |
| C08G 18/44 | (2006.01) |
| C08G 18/08 | (2006.01) |
| C08G 18/73 | (2006.01) |
| C08J 9/14 | (2006.01) |

(52) U.S. Cl.
CPC ............. *C08G 18/10* (2013.01); *C08G 18/12* (2013.01); *C08G 18/14* (2013.01); *C08G 18/289* (2013.01); *C08G 18/3893* (2013.01); *C08G 18/4244* (2013.01); *C08G 18/4252* (2013.01); *C08G 18/44* (2013.01); *C08G 18/48* (2013.01); *C08G 18/4887* (2013.01); *C08G 18/718* (2013.01); *C08G 18/73* (2013.01); *C08G 18/778* (2013.01); *C08J 9/141* (2013.01); *C08J 2203/14* (2013.01); *C08J 2207/04* (2013.01); *C08J 2375/08* (2013.01)

(58) Field of Classification Search
CPC ........ C08G 18/10; C08G 18/12; C08G 18/14; C08G 18/289; C08G 18/3893; C08G 18/4244; C08G 18/4252; C08G 18/44; C08G 18/48; C08G 18/4887; C08G 18/718; C08G 18/73; C08G 18/778; C08J 9/141; C08J 2203/14; C08J 2207/04; C08J 2375/08
See application file for complete search history.

(56) References Cited

U.S. PATENT DOCUMENTS

| | | |
|---|---|---|
| 3,404,109 A | 10/1968 | Milgrom |
| 3,829,505 A | 8/1974 | Herold |
| 3,941,849 A | 3/1976 | Herold |
| 5,158,922 A | 10/1992 | Hinney et al. |
| 5,470,813 A | 11/1995 | Le-Khac |
| 6,020,389 A | 2/2000 | Hoheneder |
| 6,767,986 B2 | 7/2004 | Moethrath et al. |
| 7,008,900 B1 | 3/2006 | Hofmann et al. |

(Continued)

FOREIGN PATENT DOCUMENTS

| | | |
|---|---|---|
| DE | 19914884 A1 | 10/2000 |
| DE | 102009057597 A1 | 6/2011 |

(Continued)

OTHER PUBLICATIONS

International Search Report for PCT/EP2013/072129 dated Jan. 23, 2014.

*Primary Examiner* — John Cooney
(74) *Attorney, Agent, or Firm* — Drinker Biddle & Reath LLP

(57) ABSTRACT

The present invention relates to an alkoxysilane-terminated prepolymer, characterized in that it is obtainable by reaction of at least A) a polyol, B) a compound having two or more isocyanate groups, and C) an alkoxysilane having at least an isocyanate group and/or an isocyanate-reactive group, wherein the polyol A) comprises at least a polyethercarbonatepolyol obtainable by addition of carbon dioxide and alkylene oxides onto H-functional starter molecules. The present invention further relates to a process for preparing the alkoxysilane-terminated prepolymer of the present invention and also to a composition and a multicomponent system comprising an alkoxysilane-terminated prepolymer of the present invention. The present invention further relates to a shaped article obtainable by polymerizing the alkoxysilane-terminated prepolymer of the present invention, by polymerizing a composition of the present invention or by polymerizing a multicomponent system of the present invention. The present invention further relates to a pressurized can containing an alkoxysilane-terminated prepolymer of the present invention, a composition of the present invention or a multicomponent system of the present invention.

14 Claims, No Drawings

(56) References Cited

U.S. PATENT DOCUMENTS

| | | | |
|---|---|---|---|
| 7,674,840 B2 | 3/2010 | Stanjek et al. | |
| 7,977,501 B2 * | 7/2011 | Haider | C08G 64/183 528/370 |
| 8,324,419 B2 | 12/2012 | Mijolovic et al. | |
| 8,846,775 B2 | 9/2014 | Mager et al. | |
| 2006/0189234 A1 | 8/2006 | Kocher et al. | |
| 2009/0018480 A1 | 1/2009 | Mager et al. | |
| 2012/0245241 A1 | 9/2012 | Peiffer et al. | |
| 2013/0161352 A1 | 6/2013 | Bodet et al. | |
| 2013/0168413 A1 | 7/2013 | Bodet et al. | |
| 2014/0024795 A1 | 1/2014 | Allen et al. | |
| 2014/0190369 A1 * | 7/2014 | Peiffer | C08G 18/48 106/287.11 |

FOREIGN PATENT DOCUMENTS

| | | |
|---|---|---|
| EP | 0 222 453 A2 | 5/1987 |
| EP | 0700949 A2 | 3/1996 |
| EP | 0743093 A1 | 11/1996 |
| EP | 0761708 A2 | 3/1997 |
| EP | 946 629 A1 | 10/1999 |
| EP | 1 098 920 A1 | 5/2001 |
| EP | 1359177 A1 | 11/2003 |
| EP | 2115032 A1 | 11/2009 |
| WO | WO-97/40086 A1 | 10/1997 |
| WO | WO-98/16310 A1 | 4/1998 |
| WO | WO-00/04069 A1 | 1/2000 |
| WO | WO-00/47649 A1 | 8/2000 |
| WO | WO-02/066532 A1 | 8/2002 |
| WO | WO-2008/013731 A1 | 1/2008 |
| WO | WO-2008092767 A1 | 8/2008 |
| WO | WO-2009/007018 A1 | 1/2009 |
| WO | WO-2009/007038 A1 | 1/2009 |
| WO | WO-2012/022685 A1 | 2/2012 |
| WO | WO-2012/022686 A1 | 2/2012 |
| WO | WO-13163442 A1 | 10/2013 |

* cited by examiner

ALKOXYSILANE-TERMINATED PREPOLYMER BASED ON POLYETHER CARBONATE POLYOLS, FOR SPRAY FOAMS

CROSS-REFERENCE TO RELATED APPLICATIONS

This application is a national stage application (under 35 U.S.C. § 371) of PCT/EP2013/072129, filed Oct. 23, 2013, which claims benefit of European Application No. 12189728.4, filed Oct. 24, 2012, both of which are incorporated herein by reference in their entirety.

The present invention relates to an alkoxysilane-terminated prepolymer obtainable by reacting at least a polyol, a polyisocyanate and an alkoxysilane having at least an isocyanate and/or isocyanate-reactive group. The present invention further relates to a process for preparing the alkoxysilane-terminated prepolymer of the present invention and also to a composition and a multicomponent system comprising an alkoxysilane-terminated prepolymer of the present invention. The present invention further relates to a shaped article obtainable by polymerizing the alkoxysilane-terminated prepolymer of the present invention, by polymerizing a composition of the present invention or by polymerizing a multicomponent system of the present invention. The present invention further relates to a pressurized can containing an alkoxysilane-terminated prepolymer of the present invention, a composition of the present invention or a multicomponent system of the present invention.

Sprayable foams are known from the prior art. There are, for instance, sprayable in-situ foams for filling cavities, for example in the building construction sector. They find particular application in the filling of gaps and voids between frames of windows and doors and the surrounding brickwork, and are notable for good damp-proofing properties as well as good thermal insulation properties. Sprayable multicomponent systems of this type are further used to insulate pipework lines or to fill cavities in technical equipment.

These aforementioned in-situ foams are typically polyurethane (PU) foams. These foams are based on compositions which consist of uncrosslinked prepolymers having a large number of free isocyanate groups. Free isocyanate groups are very reactive in that normal ambient temperature is sufficient to cause them to react with each other in the presence of water/moisture to construct a polymeric network from the prepolymers. Alcohols having two or more OH groups, corresponding thiols and also primary or secondary amines and mixtures thereof are also possible co-reactants for the aforementioned isocyanates as well as the atmospheric humidity. Polyols are particularly common for this use. The reaction with polyols/water gives rise to urethane/urea units which can form hydrogen bonds and so are able to form partly crystalline structures in the cured foam. Foam hardness, compressive strength and tensile strength are all enhanced as a result.

The starting materials are frequently put into pressurized cans and are provided with a blowing agent to facilitate the foaming up of the prepolymers as they exit from the pressurized can. In addition, the isocyanate groups of the prepolymer react with the atmospheric humidity to evolve carbon dioxide which likewise contributes to the foaming. In this reaction, the isocyanate groups involved are converted into amines which in turn can react with further isocyanate groups to form a polymeric network, i.e. are not lost from the crosslinking reaction.

Polyurethane compositions can be manufactured as 1K foams or else as two-component (2K) foams. While 1K foams need the influence of atmospheric humidity for curing, 2K foams involve separate storage of an isocyanate component on the one hand and of a polyol/aqueous component on the other and their mixing with each other only immediately before discharge. This mixing process takes place, for example, in the pressurized body of the pressurized can, the contents of which then have to be fully used tip speedily, since the polymerization takes place irrespective of whether the foam is or is not discharged. Systems of this type are therefore frequently also referred to as 1.5K foams.

Another possibility is to use a two-chamber pressurized can, where the two components are only mixed with each other in the region of the outlet valve. The main advantage of 2K foams over 1K foams consists in the appreciably faster curing reaction, since it takes place even in the absence of atmospheric humidity. By contrast, the curing rate with 1K foams is determined by the atmospheric humidity and also by the rate at which the atmospheric humidity diffuses into the foamed material.

The presence of free isocyanate groups needed to cure the foam is a disadvantage of all these processes. The presence of free isocyanate groups is undesirable for medical applications.

Polymerizable foamable compositions which do not cure via free isocyanate groups have been developed in recent years for the aforementioned reasons. U.S. Pat. No. 6,020,389 A1, for instance, discloses silicone foams comprising alkoxy-, acyloxy- or oximo-terminated silicone prepolymers. These compounds polymerize via a condensation reaction of siloxane groups. These compounds are disadvantageous because of their long curing time, since they—like the 1K polyurethane spray foams—are reliant on atmospheric humidity for the polymerization reaction. Full reaction accordingly takes a long time with comparatively thick foamed layers in particular. This is not just inconvenient, but also problematic in that the foam structure formed by the spraying will partly collapse again before the pore walls can have developed sufficient strength of their own due to the ongoing polymerization reaction.

The applications WO 00/04069 A, WO 2009/007038 A, EP 946 629 A and EP 1 098 920 A disclose alkoxysilane-terminated polyurethane prepolymers. These prepolymers have a conventional polyurethane backbone, which is obtained in a conventional manner by reaction of difunctional isocyanates with polyols. WO 00/04069 A utilizes an excess of polyfunctional isocyanates to ensure that the respective end groups of the prepolymer chains have free isocyanate groups. These isocyanate-terminated prepolymers are then reacted further with an aminoalkyltrialkoxysilane to form the desired alkoxysilane-terminated polyurethane prepolymers. Aminopropyltrimethoxysilane is used for this in particular. The prepolymer obtained therefrom bears trimethoxysilane-terminated end groups coupled to the polyurethane backbone via a propylene spacer. Owing to the propylene group between the silicon atom and the polyurethane backbone, silanes of this type are also referred to as γ-silanes.

In the curing reaction, γ-silanes react with water to eliminate alcohol and thereby form Si—O—Si networks, curing the prepolymer. γ-Silanes like the isocyanate-terminated polyurethane prepolymers have the disadvantage that the curing reaction is comparatively slow. This disadvantage can only be partly compensated by adding large amounts of crosslinking catalysts, including for example the dibutyltin dilaurate also used for polyurethane prepolymers, to γ-silane-based compositions. However, this has a disadvantageous effect on the shelf-life of such compositions in some instances.

Since even comparatively large amounts of crosslinking catalyst cannot fully compensate the low reactivity of γ-silanes, more reactive types of compounds have been sought. They are known from WO 02/066532 A1 for example. The prepolymers described therein are again silane-terminated polyurethane prepolymers. The essential difference from the previously described γ-silanes is that there is a methylene spacer between the polyurethane backbone and the silicon atom instead of the propylene group. This is why these silanes are also referred to as α-silanes. The shorter distance from the silicon atom to the highly polar urea group of the polyurethane backbone increases the reactivity of the alkoxy groups on the silicon atom (α-effect), so the hydrolysis of the alkoxysilane groups and the subsequent condensation reaction proceeds at an appreciably increased rate.

Sprayable foams based on α- or γ-silane-terminated prepolymers useful inter alia for applications in the sector of wound management are also described in the as yet unpublished European patent applications having the application numbers 11183213.5, 11183214.3 and 11183212.7. The silane-terminated prepolymers are sprayed into rapid-curing foams by a specific spraying system using blowing gas and by rapid mixing with an aqueous component in a static mixer. However, the foams described in the patent applications cited are very soft, lacking compressive strength and dimensional stability.

WO 2009/007018 describes the use of silane-terminated prepolymers in the manufacture of wound dressings in general terms. The silane-terminated prepolymers described can be based on a multiplicity of polyols known from polyurethane coating chemistry, with polyetherpolyols being preferred. Polycarbonatepolyols inter alia are also mentioned as starting components which are obtainable by condensation of carbonic acid derivatives with polyols. The polycarbonatepolyols thus obtained, however, can only be used to obtain silane-terminated prepolymers which are room temperature solid and insufficiently soluble in blowing gases. Therefore, they are very difficult to incorporate in sprayable formulations.

The problem addressed by the present invention was accordingly that of providing an alkoxysilane-terminated prepolymer which has good solubility in apolar blowing agents and hence is suitable for the production of spray foams. The spray foams obtained shall cure sufficiently rapidly, have a porous structure with a high pore volume and also have generally good mechanical properties, especially high compressive strength and dimensional stability. The prepolymer or to be more precise a spray foam obtainable therefrom shall further cover a broad field of use. More particularly, the multicomponent system shall be usable for medical applications on the skin, such as foamed wound dressings for example.

This problem is solved by the present invention by an alkoxysilane-terminated prepolymer, characterized in that it is obtainable by reaction of at least A) a polyol, B) a compound having two or more isocyanate groups, and C) an alkoxysilane having at least an isocyanate group or an isocyanate-reactive group, wherein the polyol A) comprises at least a polyethercarbonatepolyol obtainable by addition of carbon dioxide and alkylene oxides onto H-functional starter molecules.

It surprisingly transpired that the alkoxysilane-terminated prepolymers of the present invention are very useful for producing spray foams which cure sufficiently rapidly, have a porous structure with a high pore volume and also have generally good mechanical properties, especially a high compressive strength and dimensional stability. The alkoxysilane-terminated prepolymers of the present invention are simple to prepare and are highly soluble in apolar blowing agents, such as alkanes or alkenes and particularly in the industrially significant mixtures of propane and butane. These prepolymers can accordingly be made available as can-pressurizable 1K or 2K reactive foam compositions. These can be expanded into porous foams in that the 1K foam compositions can cure via the action of atmospheric humidity, while the 2K foam compositions preferably contain a curative component—most simply, a protic solvent such as water or an alcohol—and are made to polymerize in this way.

2K foam compositions of this type can be filled into a pressurized can having two or more chambers, and can be foamed up by means of blowing gases. In a pressurized can of this type, the two components of the composition according to the present invention are separated from each other until directly before the moment of foaming, ensuring a long shelf-life even without the addition of water traps or other stabilizers. As the 2K composition discharges from the pressurized can, its mixing advantageously takes place in the vicinity of the outlet valve. The resulting mixture formed from the first and second components is caused by the blowing gas also contained therein to foam up immediately on leaving the pressurized can.

The number-average molecular weight $M_n$ of all polyols is determined as described under Methods.

Component A) according to the present invention comprises at least a polyethercarbonatepolyol, which is obtainable by addition of carbon dioxide and alkylene oxides onto H-functional starter molecules, "H-functional" for the purposes of the present invention is to be understood as meaning a starter compound having hydrogen atoms which are active towards alkoxylation.

In a preferred embodiment of the present invention, the polyethercarbonatepolyol has a content of carbonate groups, reckoned as $CO_2$, of $\geq 3$ and $\leq 35$ wt %, preferably $\geq 5$ and $\leq 30$ wt % and more preferably $\geq 10$ and $\leq 28$ wt %. Determination is by NMR in accordance with the analytical method recited under Methods.

In a further preferred embodiment of the present invention, the polyethercarbonatepolyol has a number-average molecular weight $M_n$ of $\geq 500$ and $\leq 6000$ g/mol, preferably $\geq 1000$ and $\leq 5000$ g/mol, and more preferably $\geq 1000$ and $\leq 3000$ g/mol. The molecular weights are determined by titrating the OH end groups in accordance with the analytical method recited under Methods.

The polyethercarbonatepolyol preferably has $\geq 2$ and $\leq 4$, more preferably $\geq 2$ and $\leq 3$ and even more preferably 2 OH groups.

The polyethercarbonatepolyols are obtainable using in general alkylene oxides (epoxides) having 2 to 24 carbon atoms. Alkylene oxides having 2-24 carbon atoms comprise for example one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, singly or multiply epoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate. Preference for use as alkylene oxides is given to ethylene oxide and/or propylene oxide, especially propylene oxide.

In a particularly preferred embodiment of the present invention, the proportion which ethylene oxide contributes to the total amount of alkylene oxide used is $\geq 0$ to $\leq 90$ wt %, preferably $\geq 0$ and $\leq 50$ wt % and more preferably between $\geq 0$ and $\leq 25$ wt %.

The H-functional starter molecule can be any compound having an alkoxylation-active hydrogen atom. Alkoxylation-active groups having active hydrogen atoms include for example —OH, —$NH_2$ (primary amines), —NH— (secondary amines), —SH and —$CO_2H$, preferably —OH and —$NH_2$ and more preferably —OH. The H-functional starter molecule used comprises for example one or more compounds selected from the group consisting of polyhydric alcohols, polyhydric amines, polyhydric thiols, aminoalcohols, thioalcohols, hydroxyesters, polyetherpolyols, polyesterpolyols, polyesteretherpolyols, polyethercarbonatepolyols, polycarbonatepolyols, polycarbonates, polyethyleneimine, polyetheramines (for example, Jeffamine® from Huntsman), polytetrahydrofurans (e.g. PolyTHF® from BASF, for example PolyTHF® 250, 650S, 1000, 1000S, 1400, 1800, 2000), polytetrahydrofuranamines (BASF product Polytetrahydrofuranamine 1700), polyetherthiols, polyacrylatepolyols, castor oil, the mono- or diglyceride, of ricinoleic acid, monoglycerides of fatty acids, chemically modified mono-, di- and/or triglycerides of fatty acids, and $C_1$-$C_{24}$ alkyl fatty acid esters containing on average at least two OH groups per molecule. The $C_1$-$C_{24}$ alkyl fatty acid esters which contain on average at least two OH groups per molecule comprise for example commercial products such as Lupranol Balance® (from BASF AG), Merginol® (from Hobum Oleochemicais GmbH), Sovermol® (from Cognis Deutschland GmbH & Co. KG) and Soyol®TM (from USSC Co.).

Examples of polyhydric alcohols useful as H-functional starter molecules include dihydric alcohols, e.g. ethylene glycol, diethylene glycol, propylene glycol, dipropylene glycol, 1,3-propanediol, 1,4-butanediol, 1,4-butenediol, 1,4-butynediol, neopentylglycol, 1,5-pentanediol, methylpentanediols (e.g. 3-methyl-1,5-pentanediol), 1,6-hexanediol; 1,8-octanediol, 1,10-decanediol, 1,12-dodecanediol, bis(hydroxymethyl)cyclohexanes (e.g. 1,4-bis(hydroxymethyl)cyclohexane), triethylene glycol, tetraethylene glycol, polyethylene glycol, dipropylene glycol, tripropylene glycol, polypropylene glycol, dibutylene glycol and polybutylene glycols; trihydric alcohols, for example trimethylolpropane, glycerol, trishydroxyethyl isocyanurate and castor oil; tetrahydric alcohols, for example pentaerythritol; polyalcohols, for example sorbitol, hexitol, sucrose, starch, starch hydrolysates, cellulose, cellulosehydrolysates, hydroxyl-functionalized fats and oils, especially castor oil, and also any modification products of these aforementioned alcohols with different amounts of ε-caprolactone.

H-functional starter molecules can also be selected from the class of polyetherpolyols, especially those having a number-average molecular weight $M_n$ in the range from 200 to 4000 g/mol, preferably 250 to 2000 g/mol. Preference is given to polyetherpolyols constructed of ethylene oxide and propylene oxide repeat units, preferably having a 35 to 100% share of propylene oxide units and more preferably a 50 to 100% share of propylene oxide units. These copolymers of ethylene oxide and propylene oxide can be random copolymers, gradient copolymers, alternating copolymers or block copolymers. Examples of suitable polyetherpolyols constructed of propylene oxide and/or ethylene oxide repeat units include the Desmophen®, Acclaim®, Arcol®, Baycoll®, Bayfill®, Bayflex®, Baygal®, PET® and Polyether polyols from Bayer MaterialScience AG (e.g. Desmophen® 3600Z, Desmophen® 1900U, Acclaim® Polyol 2200, Acclaim® Polyol 4000I, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Suitable homo polyethylene oxides further include for example the Pluriol® E products from BASF SE, suitable homo polypropylene oxides include for example the Pluriol® P products from BASF SE and suitable mixed copolymers of ethylene oxide and propylene oxide include for example the Pluronic® PE or Pluriol® RPE products from BASF SE.

H-functional starter molecules can also be selected from the class of polyesterpolyols, especially those having a number-average molecular weight $M_n$ in the range from 200 to 4500 g/mol, preferably 400 to 2500 g/mol. At least difunctional polyesters are used as polyesterpolyols. Polyesterpolyols preferably consist of alternating acid and alcohol units. Useful acid components include for example succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalie anhydride or mixtures thereof. Useful alcohol components include for example 1,2-ethanediol, 1,2-propanediol, 1,3-propanediol, 1,4-butanediol, 1,5-pentanediol, neopentylglycol, 1,6-hexanediol, 1,4-bis(hydroxymethyl)cyclohexane, diethylene glycol, dipropylene glycol, trimethylolpropane, glycerol, pentaerythritol or mixtures thereof. When dihydric or polyhydric polyetherpolyols are used as alcohol component, polyesteretherpolyols are obtained which are likewise useful as starter molecules for preparing the polyethercarbonatepolyols. When polyetherpolyols are used for preparing polyesteretherpolyols, polyetherpolyols having a number-average molecular weight $M_n$ of 150 to 2000 g/mol are preferred.

Useful H-functional starter molecules further include polycarbonatepolyols, for example polycarbonatediols, especially those having a number-average molecular weight $M_n$ in the range from 150 to 4500 g/mol, preferably 500 to 2500, obtainable for example by reaction of phosgene, dimethyl carbonate, diethyl carbonate or diphenyl carbonate and di- and/or polyfunctional alcohols or polyesterpolyols or polyetherpolyols. Examples regarding polycarbonatepolyols are found for example in EP 1359177 A. The Desmophen® C products from Bayer MaterialScience AG, e.g. Desmophen® C 1100 and Desmophen® C 2200, can be used as polycarbonatediols for example. Polyethercarbonatepolyols can likewise be used as H-functional starter molecules. Polyethercarbonatepolyols obtained by the process described herein are used in particular. These polyethercarbonatepolyols used as H-functional starter molecules are first prepared in a separate reaction step.

H-functional starter molecules have a functionality (i.e. number of polymerization-active hydrogen atoms per molecule) of 1 to 8 in general and of 2 or 3 for preference. H-functional starter molecules are used either singly or as a mixture of two or more H-functional starter molecules. Preferred H-functional starter molecules are alcohols of general formula (I),

  (I)

where x is from 1 to 20 and preferably an even number from 2 to 20. Examples of alcohols conforming to formula (I) are ethylene glycol, 1,4-butanediol, 1,6-hexanediol, 1,8-octanediol, 1,10-decanediol and 1,12-dodecanediol. Preferred H-functional starter molecules further include neopentylglycol, trimethylolpropane, glycerol, pentaerythritol, reaction products of alcohols conforming to formula (I) with ε-caprolactone, e.g. reaction products of trimethylolpropane with ε-caprolactone, reaction products of glycerol with ε-caprolactone, and also reaction products of pentaerythritol with ε-caprolactone. Preferred H-functional starter molecules further include water, diethylene glycol, dipropylene glycol, castor oil, sorbitol and polyetherpolyols constructed of polyalkylene oxide repeat units.

H-functional starter molecules more preferably comprise one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentylglycol, 1,6-hexanediol, diethylene glycol, dipropylene glycol, glycerol, trimethylolpropane, di- and trifunctional polyetherpolyols wherein the polyetherpolyol is constructed from a di- or tri-H-functional starter molecule and propylene oxide or from a di- or tri-H-functional starter molecule, propylene oxide and ethylene oxide. The number-average molecular weight $M_n$ of the polyetherpolyols is preferably in the range from 62 to 4500 g/mol, more preferably in the range from 62 to 3000 g/mol and most preferably in the range from 62 to 1500 g/mol. The functionality of the polyetherpolyols is preferably in the range from 2 to 3 and more preferably equal to 2.

In one preferred embodiment of the present invention, the polyethercarbonatepolyol is obtainable by addition of carbon dioxide and alkylene oxides onto H-functional starter molecules by using multimetal cyanide catalysts (DMC catalysts). The preparation of polyethercarbonatepolyols by addition of alkylene oxides and $CO_2$ onto H-functional starters by using DMC catalysts is known from EP 0222453 A, WO 2008/013731 A and EP 2115032 A for example.

DMC catalysts are known in principle from the prior art relating to the homopolymerization of epoxides (see, for instance, U.S. Pat. No. 3,404,109 A, U.S. Pat. No. 3,829,505 A, U.S. Pat. No. 3,941,849 A and U.S. Pat. No. 5,158,922 A). DMC catalysts described in U.S. Pat. No. 5,470,813 A, EP 700 949 A, EP 743 093 A, EP 761 708 A, WO 97/40086 A, WO 98/16310 A and WO 00/47649 A for example have very high activity in the homopolymerization of epoxides and facilitate the production of polyetherpolyols at very low catalyst concentrations (25 ppm or less). One typical example is that of the high-activity DMC catalysts described in EP-A 700 949, which contain a polyether having a number-average molecular weight $M_n$ greater than 500 g/mol as well as a double metal cyanide compound (e.g. zinc hexacyanocobaltate(III)) and an organic complexing ligand (e.g. tertiary butanol).

The DMC catalyst is usually used in an amount ≤1 wt %, preferably in an amount ≤0.5 wt %, more preferably in an amount of ≥0 ppm and ≤500 ppm and most preferably in an amount of ≥0 ppm and ≤300 ppm, all based on the weight of the polyethercarbonatepolyol.

The polyethercarbonatepolyols are preferably prepared in a pressure reactor. The one or more alkylene oxides and the carbon dioxide are introduced after the optional drying of a starter-molecule substance or of the mixture of two or more starter-molecule substances and after the addition of the DMC catalyst and also of the additive(s), which are added before or after drying, as a solid material or in the form of a suspension. The one or more alkylene oxides and the carbon dioxide can in principle be introduced in various ways. At the start of their introduction there can be a vacuum or a previously selected admission pressure in the pressure reactor. An admission pressure is preferably established by passing an inert gas, such as nitrogen for example, into the pressure reactor to establish a pressure ≥10 mbar and ≤5 bar, preferably ≥100 mbar and ≤3 bar and preferably ≥500 mbar and ≤2 bar.

The one or more alkylene oxides and the carbon dioxide can be introduced simultaneously or sequentially, in which case the entire quantity of carbon dioxide can be added all at once or in metered fashion throughout the reaction time. The one or more alkylene oxides can be introduced simultaneously with or sequentially in relation to the introduction of carbon dioxide. When two or more alkylene oxides are used for synthesizing the polyethercarbonatepolyols, they can be introduced simultaneously or sequentially via respectively separated metering regimes or via one or more metering regimes, in which case two or more alkylene oxides are introduced as a mixture. Random, alternating, block or gradient polyethercarbonatepolyols can be synthesized depending on the method of introducing the alkylene oxides and the carbon dioxide.

It is preferable to use an excess of carbon dioxide; more particularly, the amount of carbon dioxide is determined via the overall pressure under reaction conditions. Excess carbon dioxide is advantageous because of the comparative lack of reactivity on the part of carbon dioxide. It has been determined that it is the reaction at 60 to 150° C., preferably at 70 to 140° C. and more preferably at 80 to 130° C. and pressures of 0 to 100 bar, preferably 1 to 90 bar and more preferably 3 to 80 bar which produces the polyethercarbonatepolyols. At temperatures below 60° C., the reaction stops. At temperatures above 150° C., there is a pronounced increase in the amount of undesired by-products.

The proportion of component A) which is attributable to the polyethercarbonatepolyol is preferably ≥50 and ≤100 wt %, more preferably ≥60 and ≤100 wt %, and more preferably ≥70 and ≤95 wt %.

Component A) in addition to the polyetherpolycarbonatepolyols referred to above may contain the familiar polyester- or polyetherpolyols of polyurethane chemistry.

Possible hydroxyl-containing polyesters include, for example, reaction products of polyhydric, preferably dihydric, alcohols with polybasic, preferably dibasic, polycarboxylic acids. Instead of the free carboxylic acids, the corresponding polycarboxylic anhydrides or the corresponding polycarboxylic esters of low alcohols or mixtures thereof can also be used for preparing the polyesters.

Polycarboxylic acids can be aliphatic, cycloaliphatic, aromatic and/or heterocyclic in nature and may be substituted, by halogen atoms for example, and/or unsaturated. Aliphatic and cycloaliphatic dicarboxylic acids are preferred. Examples are succinic acid, adipic acid, azelaic acid, sebacic acid, phthalic acid, tetrachlorophthalic acid, isophthalic acid, terephthalic acid, tetrahydrophthalic acid, hexahydrophthalic acid, cyclohexanedicarboxylic acid, itaconic acid, sebacic acid, glutaric acid, suberic acid, 2-methylsuccinic acid, 3,3-diethylglutaric acid, 2,2-dimethylsuccinic acid, maleic acid, malonic acid, fumaric acid or dimethyl terephthalate. Any anhydrides of these acids are likewise useful. Examples are maleic anhydride, phthalic anhydride, tetrahydrophthalic anhydride, glutaric anhydride, hexahydrophthalic anhydride and tetrachlorophthalic anhydride.

Trimellitic acid may be mentioned here as a polycarboxylic acid which may optionally also be used in small amounts.

Polyhydric alcohols are preferably diols. Examples of such diols include for instance ethylene glycol, 1,2-propylene glycol, 1,3-propylene glycol, 1,4-butanediol, 2,3-butanediol, diethylene glycol, triethylene glycol, 1,6-hexanediol, 1,8-octanediol, neopentyl glycol, 2-methyl-1,3-propanediol or neopentylglycol hydroxypivalate. Polyesterdiols from lactones, for example ε-caprolactone, can also be used. Trimethylolpropane, glycerol, erythritol, pentaerythritol, trimethylolbenzene or trishydroxyethyl isocyanurate may be mentioned here as examples of optional polyols.

Possible hydroxyl-containing polymers include those obtainable by polymerization of cyclic ethers such as ethylene oxide, propylene oxide, butylene oxide, tetrahydrofuran, styrene oxide or epichlorohydrin with themselves, for example in the presence of $BF_3$ or alkaline catalysts, or by addition of these ring compounds, optionally in admixture or in succession, onto H-functional starter components. Useful H-functional starter components also include the compounds described above for the polyethercarbonatepolyols.

Preferred hydroxyl-containing polyethers are those based on ethylene oxide, propylene oxide or tetrahydrofuran or mixtures thereof.

A preferred embodiment of the present invention, in addition to the polyethercarbonatepolyols referred to above, utilizes polyetherpolyols wherein the share of ethylene oxide units is ≤30 wt % and more preferably ≤20 wt %, based on the polyetherpolyol. More preferably, the share of ethylene oxide units is ≥3 and ≤30 wt %, especially ≥5 and ≤20 wt %, all based on the polyetherpolyol. The other alkylene oxide units can very largely be propylene oxide units, although other structural units can be present, as well. Irrespective of this, polyethers without ethylene oxide units can also be used.

Component B) for preparing the alkoxysilane-terminated prepolymers of the present invention can in principle be any aromatic, araliphatic, aliphatic or cycloaliphatic compound having two or more isocyanate groups which is known per se to a person skilled in the art. Examples of this type of polyisocyanates are 1,4-butylene diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or their mixtures of any desired isomeric content, 1,4-cyclohexylene diisocyanate, 1,4-phenylene diisocyanate, 2,4- and/or 2,6-tolylene diisocyanate, 1,5-naphthylene diisocyanate, 2,2'- and/or 2,4'- and/or 4,4'-diphenylmethane diisocyanate, 1,3- and/or 1,4-bis(2-isocyanatoprop-2-yl)benzene (TMXDI), 1,3-bis(isocyanatomethyl)benzene (XDI), alkyl 2,6-diisocyanatohexanoate (lysine diisocyanates) with C1-C8 alkyl groups, and also 4-isocyanatomethyl-1,8-octane diisocyanate (nonane triisocyanate) and triphenylmethane 4,4',4"-triisocyanate. Any desired mixtures of the compounds referred to can also be used.

In addition to the compounds referred to above, modified diisocyanates or triisocyanates of uretdione, isocyanurate, urethane, allophanate, biuret, iminooxadiazinedione and/or oxadiazinetrione structure can also be used as part of component B).

Component B) preferably comprises aliphatic and/or cycloaliphatic compounds having two or more isocyanate groups, more preferably aliphatic compounds having two or more isocyanate groups.

The average isocyanate functionality of component B) is preferably in the range from 2 to 4, more preferably in the range from 2 to 2.6 and most preferably equal to 2.

Component C) is required by the present invention to comprise at least an alkoxysilane having at least an isocyanate group and/or an isocyanate-reactive group. Isocyanate-reactive groups are functional groups capable of reacting with isocyanate groups by elimination of hydrogen. The isocyanate-reactive groups are preferably OH, SH and/or amino groups.

Suitable alkoxysilanes with isocyanate-reactive groups are well known to a person skilled in the art, examples including aminopropyltrimethoxysilane, mercaptopropyltrimethoxysilane, aminopropylmethyldimethoxysilane, mercaptopropylmethyldimethoxysilane, aminopropyltriethoxysilane, mercaptopropyltriethoxysilane, aminopropylmethyldiethoxysilane, mercaptopropylmethyldiethoxysilane, aminomethyltrimethoxysilane, aminomethyltriethoxysilane, (aminomethyl)methyldimethoxysilane, (aminomethyl)methyldiethoxysilane, N-butylaminopropyltrimethoxysilane, N-ethylaminopropyltrimethoxysilane, N-phenylaminopropyltrimethoxysilane, diethyl N-(3-triethoxysilylpropyl)aspartate, diethyl N-(3-trimethoxysilylpropyl) aspartate, diethyl N-(3-dimethoxymethylsilylpropyl)aspartate, (N-cyclohexylaminomethyl)methyldiethoxysilane, (N-cyclohexylaminomethyl)triethoxysilane, (N-phenylaminomethyl)methyldimethoxysilane and (N-phenylaminomethyl)trimethoxysilane. Preference is given to the use of (N-cyclohexylaminomethyl)methyldiethoxysilane, (N-cyclohexylaminomethyl)triethoxysilane, (N-phenylaminomethyl)methyldimethoxysilane and/or (N-phenylaminomethyl)trimethoxysilane and very particular preference is given to the use of (N-cyclohexylaminomethyl)methyldiethoxysilane and/or (N-cyclohexylaminomethyl)triethoxysilane.

Suitable alkoxysilanes with isocyanate groups are likewise known in principle. The examples include isocyanatomethyltrimethoxysilane, isocyanatomethyltriethoxysilane, (isocyanatomethyl)methyl-dimethoxysilane, (isocyanatomethyl)methyldiethoxysilane, 3-isocyanatopropyltrimethoxysilane, 3-isocyanatopropylmethyldimethoxysilane, 3-isocyanatopropyltriethoxysilane and 3-isocyanatopropyl-methyldiethoxysilane. Preference is given to the use of 3-isocyanatopropyltrimethoxysilane and 3-isocyanatopropyltriethoxysilane.

The use of di- or trialkoxysilanes is preferred, of trialkoxysilanes is particularly preferred and of triethoxy- and/or trimethoxysilanes is very particularly preferred.

In one preferred embodiment of the present invention, the alkoxysilane of component C) is an α-alkoxysilane.

An α-silane group, as mentioned, has a methylene spacer between the silicon atom and the isocyanate or isocyanate-reactive group. Silanes of this type are notable for particular reactivity for the condensation reaction. Therefore, the use of heavy metal-based crosslinking catalysts such as organic titanates or organic tin(IV) compounds can be completely eschewed in the context of the present invention. This is particularly advantageous in relation to medical applications for the composition of the present invention.

In one preferred embodiment of the present invention, the alkoxysilane-terminated prepolymer is obtainable by reaction of at least alkoxysilane C), having isocyanate-reactive groups, with an NCO-terminated polyurethane prepolymer, wherein the NCO-terminated polyurethane prepolymer is obtainable by reaction of at least the isocyanate-functional compound B) with the polyol A). The average NCO functionality of the NCO-terminated polyurethane prepolymer here may preferably be ≤4 and especially ≥2 and ≤4.

An alkoxysilane-terminated prepolymer of the aforementioned type is particularly advantageous for medical applications because its viscosity is sufficiently low for it to be readily foamable.

In a further, but less preferred embodiment of the present invention, the alkoxysilane-terminated prepolymer is also obtainable by reacting at least the alkoxysilane C), containing isocyanate groups, with an OH-terminated prepolymer, in which case the OH-terminated polyurethane prepolymer is obtainable by reaction of at least the compound B) with the polyol A). In this case, however, the alkoxysilane-terminated prepolymers have a higher viscosity compared with those obtained by reaction of isocyanate-functional prepolymers and isocyanate-reactive alkoxysilanes, and therefore are less suitable for spray foam applications.

The present invention further provides a process for preparing an alkoxysilane-terminated prepolymer according to the present invention comprising the steps of:
  reacting the polyol A) with the compound B) to form an isocyanate- or OH-terminated polyurethane prepolymer, preferably an NCO-terminated prepolymer, and
  reacting the isocyanate- or OH-terminated polyurethane prepolymer, preferably the isocyanate-terminated prepolymer, with the alkoxysilane C) to form the alkoxysilane-terminated prepolymer.

The temperature at which polyol A) is reacted with isocyanate-functional compound B) is preferably in the range from 60° C. to 150° C. and more preferably in the range from 70° C. to 130° C. Adding an inert solvent is possible, but not preferable, since this solvent would subsequently have to be removed again by distillation. The components are preferably premixed at slightly elevated temperature, in which case it is freely choosable in principle whether component A) is added to component B), or vice versa. It is the viscosity of the particular polyol A) used which determines whether B) is added to A) or vice versa. The use of a catalyst is possible, but not preferable. The reaction without catalyst is preferable in order that end products without toxic potential may be obtained. The catalysts which a person skilled in the art generally/commonly knows from polyurethane chemistry are suitable catalysts.

The molar ratio between polyol A) and isocyanate-functional compound B) can in principle be varied within wide limits. The target is preferably a silane-terminated prepolymer of low molecular weight and low viscosity, so the use of a distinct excess of isocyanate groups, based on the OH groups used, is preferable. It is customary to use a 5-20 times excess of isocyanate groups, based on the OH groups used.

The reaction mixture is preferably stirred at the reaction temperature until the theoretical NCO value is reached or the actual NCO value is slightly below the theoretical NCO value.

In a further preferred embodiment of the present invention, the NCO-terminated prepolymer is subsequently purified of unconverted fractions of the monomeric isocyanate-functional compound B). After purification, the fraction of unconverted monomeric isocyanate-functional compounds B) is ≤0.5 wt %. This can be achieved in various ways known per se to a person skilled in the art. Purifying the prepolymers by distillation at reduced pressure, especially via a thin-film distillation, is particularly suitable according to the present invention. This purification procedure is particularly advantageous because it has transpired that compositions whose prepolymers were freed of polyisocyanates via a thin-film distillation are better foamable, since the viscosities of the compositions are simpler to adjust and altogether less viscous prepolymers are obtained. The exact temperature and reduced pressure values depend on the monomeric isocyanate-functional compound B) used.

To prepare the silane-terminated prepolymer, it is preferable for the isocyanate- or OH-terminated prepolymer to be initially charged and reacted with an alkoxysilane containing isocyanate groups and/or isocyanate-reactive groups. The temperature for adding the alkoxysilane is preferably in the range from 25 to 70° C. and more preferably in the range from 30 to 50° C. It is preferable to use sufficient alkoxysilane for the ratio of isocyanate groups to isocyanate-reactive groups or of OH groups to isocyanate groups to be 1:1. After addition, the reaction mixture is preferably stirred at temperatures between 30 and 70° C., more preferably at 30 to 50° C., until free isocyanate groups are no longer detectable. The free isocyanate groups are typically determined using IR spectroscopy. The isocyanate group has a very characteristic band at about 2260 cm$^{-1}$ in the IR spectrum, so the absence of isocyanate groups is very easily detectable. If the isocyanate group is not fully converted by the computed amount of alkoxysilane, further appropriate amounts of alkoxysilane can be subsequently added in order that the reaction may be completed.

The alkoxysilane-terminated prepolymer obtained by the preferred process thus no longer contains any IR- or titration-detectable free isocyanate groups and hence can be called isocyanate-free.

The present invention further provides a composition characterized in that it comprises at least an alkoxysilane-terminated prepolymer i) according to the present invention and at least one further component.

In a preferred embodiment of the composition according to the present invention, it contains as further component ≥1 and ≤70 wt %, preferably ≥1 and ≤30 wt % and more preferably ≥5 and ≤20 wt %, of an alkoxysilane-terminated prepolymer other than i), which contains a polyetherpolyol and/or a polyesterpolyol having a number-average molecular weight $M_n$ of ≥500 and ≤7000 g/mol as polyol component a). The preferred general embodiments explained in the context of component A) for the polyether- and polyesterpolyols likewise apply.

It is particularly preferable for the polyetherpolyol of component a) to include ethylene and/or propylene oxide units, while the proportion of ethylene oxide units is ≤50 wt % and preferably in the range from 10 to 30 wt % based on the polyetherpolyol.

The composition of the present invention is preferably free of monomeric isocyanate compounds which, in the context of the present invention, is to be understood as meaning a system containing less than 0.5 wt. % of monomeric isocyanate compounds.

A preferred embodiment of the composition according to the present invention further comprises alkoxysilane-terminated polyisocyanates. These are obtainable by reacting diisocyanates, modified diisocyanates or triisocyanates of uretdione, isocyanurate, urethane, allophanate, biuret, iminooxadiazinedione and/or oxadiazinetrione structure, or mixtures thereof, with alkoxysilanes having at least one isocyanate-reactive group. Preference is given to using triisocyanates with isocyanurate structures (for example Desmodur N 3300 from Bayer Material Science AG), iminooxadiazinedione structures (for example Desmodur N 3900 from Bayer Material Science AG) and/or with allophanate structures (for example Desmodur XP 2580 from Bayer Material Science AG). The aforementioned compounds are likewise useful as alkoxysilanes having at least one isocyanate-reactive group. The proportion which the alkoxysilane-terminated polyisocyanates contribute to the composition is preferably ≥0 and ≤60 wt %, more preferably ≥1 and ≤30 wt % and most preferably ≥5 and ≤15 wt %.

The composition of the present invention may further comprise active medical, and/or cosmetic ingredients, blowing gases and/or auxiliaries as components. The preferred embodiments adduced for these components in the rest of the text apply.

The silane-terminated prepolymer of the present invention or the composition of the present invention can be applied to a surface without further auxiliaries and be cured by the water content of the atmosphere or by the water content on the surface. The STP can accordingly be used for a one-component (1K) foam application.

However, the silane-terminated prepolymer of the present invention or the composition of the present invention is particularly suitable for foam application from a pressurized can. Therefore, the composition preferably comprises a pressure-liquefied blowing gas. The blowing gas may preferably comprise at least an alkane or alkene of 1 to 5 carbon atoms in either case and, more particularly, at least a compound from the group ethane, propane, n-butane, isobutane, pentane and mixtures thereof. Although other blowing gases, such as dimethyl ether for example, are also possible in principle, the blowing gases used come more preferably from the aforementioned alkanes/alkenes.

The composition at a pressure of 1.5 bar and a temperature of 20° C. for example can contain at least 3 wt % of blowing gases, based on the composition, while the blowing gas is completely dissolved in the composition. Complete solubility can be ascertained at 20° C. in "test glasses for optical checks of aerosols" from Pamasol Willi Mäder AG, CH. There is complete solubility for the purposes of the present invention when the blowing gas does not form a visually perceivable second phase for a sustained period (>1 h).

In a particularly preferred embodiment, the level of dissolved blowing gas is from 10 to 30 wt % based on the entire composition, preferably 15 to 30 wt %.

Adding a silane-terminated prepolymer based on a polyetherdiol as defined above to the silane-terminated prepolymer according to the present invention and based on polyethercarbonatepolyols renders the foamable mixture better wettable with water. As a result, the alkoxysilane groups hydrolyse more rapidly and the spray-dispensed foams cure more rapidly.

However, a system of two or more components which is based on the silane-terminated prepolymer of the present invention or on the composition of the present invention is preferable.

The present invention further provides a multicomponent system comprising at least two separate components, wherein the first component I) comprises an alkoxysilane-terminated prepolymer according to the present invention or a composition according to the present invention and the second component II) comprises a protic compound, preferably at least one protic solvent or a mixture of protic solvents.

The multicomponent system of the present invention is likewise preferably free of monomeric isocyanate compounds which, in the context of the present invention, is to be understood as meaning a system containing less than 0.5 wt % of monomeric isocyanate compounds.

Component II) may most simply contain water or even consist of water. Advantageously, however, component II) does comprise further constituents.

Water-miscible solvents may be present in component II) as well as water. On account of the preferred skin-contact use in the medical sector, a complete absence of toxic side-effects is expected of preferred materials.

Component II) may further comprise low molecular weight polyols, which preferably have a molar mass of ≥62 and ≤500 g/mol. The low molecular weight polyols are preferably selected from the group ethylene glycol, glycerol and/or sorbitol, with glycerol being particularly preferred. The proportion of component. II) which is attributable to polyols may preferably be from 0.1 to 80 wt %, more preferably from 20 to 75 wt % and most preferably from 40 to 70 wt %.

It is further particularly advantageous for component II) to have a pH of ≥pH 3.0 and ≤9.0. This is because it has surprisingly transpired that an alkoxysilane-terminated prepolymer is very quickly curable with an aqueous component at the aforementioned pH values, so a composition of this type can be filled into a two-chamber or multichamber pressurized can and be foamed up with blowing gases into stable fine-cell foams. Owing to the moderate pH range of the aqueous component, ≥pH 3.0 and ≤9.0, the composition of the present invention can be applied directly to human or animal skin for example.

To further improve skin compatibility, the pH of the aqueous component may preferably be ≥3.5 and ≤8.0, especially ≥4.0 and ≤6.5. Within this pH range there is a virtually complete absence of skin irritation even in the case of sensitive skin. At the same time, the compositions obtained on mixing component I) and component II) cure at the aforementioned high rate.

The aforementioned pH ranges can in principle be established in any conceivable manner. Thus, component II) can comprise at least an acid, a base or a buffering system, in which case the addition of a buffering system is preferred. The comparison of two multicomponent systems, of which one comprises an acid in component II) and the other comprises a buffering system at the same pH in component II), for example, shows that the curing of the silane-terminated prepolymer is influenced positively in the case of the multicomponent system with the buffering system, so especially finer-cell foams are obtained.

Useful acids include organic and inorganic compounds which are at least partly water-soluble and, on dissolving, shift the pH into the acidic region. Mineral acids such as phosphoric acid are an example of this. Useful organic acids include for example formic acid, acetic acid, various α-chloroacetic acids, lactic acid, malic acid, citric acid, tartaric acid, succinic acid and the like. Mixtures of the aforementioned chemistries can also be used.

Bases useful for the purposes of the present invention can likewise be of organic and inorganic origin and at least partly water-soluble, shifting the pH into the alkaline region on dissolving. The examples of this are the alkali metal or alkaline earth metal hydroxides such as sodium hydroxide or potassium hydroxide and ammonia, to name but a few. Useful organic bases include for example nitrogenous compounds such as primary, secondary, tertiary aliphatic or cycloaliphatic amines and also aromatic amines. Mixtures of the aforementioned chemistries can moreover likewise be used.

A buffering system used according to the present invention comprises in general a mixture of a weak acid and its conjugated base, or vice versa. Ampholytes can also be used.

Buffers used in the context of the present invention are more particularly selected from acetate buffer, phosphate buffer, carbonate buffer, citrate buffer, tartrate buffer, succinic acid buffer, THIS, HEPES, HEPPS, MES, Michaelis buffer or mixtures thereof. However, the present invention is not limited to the aforementioned systems. In principle, any buffering system which can be adjusted such that the claimed pH range can be set is usable.

In one preferred embodiment of the present invention, the buffering system is based on organic carboxylic acids and their conjugated bases. The organic carboxylic acids more preferably have one, two or three carboxyl groups. It is very particularly preferred for the buffering system to be based on acetic acid, succinic acid, tartaric acid, malic acid or citric acid and the respective conjugated base. Mixtures of the aforementioned chemistries can moreover likewise be used.

In further refinement of the multicomponent system according to the present invention, the concentration of the buffering system in component II) is preferably ≥0.001 and ≤2.0 mol/l, more preferably ≥0.01 and ≤1.0 mol/l and most preferably ≥0.01 and ≤0.5 mol/l. These concentrations are particularly preferred because sufficient buffering capacity is made available while, on the other hand, there is no crystallization of buffer out of component II) under typical storage conditions. This would be disadvantageous for use in pressurized cans for example, since crystallized-out constituents might plug the mixing device or the nozzle of the pressurized can.

Further preferably, the buffering capacity of component II) is ≥0.01 mol/l, especially ≥0.02 and ≤0.5 mol/l.

It may be advantageous in the context of the present invention for the viscosity of component II) to be adapted, for example in order that its miscibility with the silane-terminated prepolymer in a mixing device of a two-chamber pressurized can may be facilitated. The dynamic viscosity of component II) at 23° C. can thus be in the range from 10 to 4000 mPas, especially from 300 to 1000 mPas. Viscosity can be conveniently determined using rotary viscometry in accordance with German standard specification DIN 53019 at 23° C. with a rotary viscometer at a rotary frequency of 18 $s^{-1}$ from Anton Paar Germany GmbH, Ostfildern, DE.

In a particularly preferred refinement, of the multicomponent system according to the present invention, component II) may include a thickener. A Thickener can be used to set the abovementioned viscosities. There is a further advantage to a thickener in that it has some stabilizing effect on the foam and so can help to maintain the foam structure until it has reached the point where it is capable of supporting its own weight.

It has further surprisingly transpired that the addition of thickeners, especially the addition of starch- or cellulose-based thickeners, has the effect that a whole series of commercially available blowing gases become soluble in the aqueous phase. Since the solubility of these blowing gases in component I), comprising the silane prepolymer, tends to be less problematic, this prevents phase separation between the blowing gas and component I)/component II) in the respective chambers of the multichamber pressurized can. Hence the blowing gas and component I) on the one hand and the blowing gas and component II) on the other form a very largely homogeneous mixture until it is time to leave the pressurized can. After the two components I) and II), which are kept apart in the can, have come to be mixed in a mixing nozzle of the pressurized can, the blowing gas dissolved in the mixture causes substantial expansion of this mixture as it leaves the pressurized can, so a fine-cell foam is obtained. Therefore, thickeners to be used to particular advantage are selected from starch, starch derivatives, dextrin derivatives, polysaccharide derivatives such guar gum, cellulose, cellulose derivatives, especially cellulose ethers, cellulose esters, organic wholly synthetic thickeners based on polyacrylic acids, polyvinylpyrrolidones, poly(meth)acrylics or polyurethanes (associative thickeners) and also inorganic thickeners, such as bentonites or silicas or mixtures thereof. Specific examples are methylcellulose or carboxymethylcellulose, for example as sodium salt.

It can further be provided in the context of the present invention that component I) comprises or consists of a polyurethane dispersion. A commercially available polyurethane dispersion can be used therefor for example, the concentration of which can also be lowered with additional water, if desired, and which is then brought into the recited pH range using the abovementioned possibilities. The use of a polyurethane dispersion is advantageous because blowing-gas solubility in the aqueous phase can be increased in this way with regard to the abovementioned alkanes and alkenes specifically.

A further advantage of the aforementioned pH values in combination with the polyurethane dispersion is that in these ranges there is generally no coagulation of the polymer particles of the polyurethane dispersion; in other words, the dispersion is stable in storage under these conditions. It has surprisingly transpired that the use of a polyurethane dispersion can further increase the solubility of commercially available blowing gases in the aqueous component. St is therefore particularly preferable to use a polyurethane dispersion and a thickener of the aforementioned type.

The polyurethane dispersion used can in principle be any commercially available polyurethane dispersion. However, it is again advantageous here to use polyurethane dispersions prepared from isocyanates free from aromatics, since these are less concerning for medical applications in particular. In addition, the polyurethane dispersion can also contain further ingredients. The polyurethane content of the polyurethane dispersion is more preferably in the range from 5 to 65 wt % and especially in the range from 20 to 60 wt %.

In development of the multicomponent system according to the present invention, the weight average of the polyurethane in the polyurethane dispersion is in the range 10 000 to 1 000 000 g/mol, especially 20 000 to 200 000 g/mol, all determined via gel permeation chromatography versus polystyrene standard in tetrahydrofuran at 23° C. Polyurethane dispersions having such molar masses are particularly advantageous because they constitute storage-stable polyurethane dispersions which, moreover, on filling into pressurized cans, bring about good solubility for the blowing gas in the second component.

The mixing ratios of components I) and II) of the multicomponent system according to the present invention are advantageously adjusted relative to each other such that complete polymerization takes place with component I) ideally being converted quantitatively therein. For example, components I) and II) of the multicomponent system according to the present invention are therefore present in a volume ratio of 1:10 to 10:1 relative to each other, preferably in a volume ratio of 1:1 to 5:1 relative to each other especially 2:1 to 3:1, more preferably at a volume ratio equal to about 2.5:1.

The multicomponent system of the present invention has a high rate of cure. As a result, a self-supporting foam structure can be formed more or less directly after expansion, so the foam can virtually not collapse again before being fully cured through, which generally only takes a few minutes. The foam structure develops with the assistance of inert blowing gases which, on opening an overpressure valve, drive the viscous prepolymers out of the chamber of the spraying system. The curing mixture of components is additionally foamed by the escaping blowing gas. The present invention thus, in addition to the 1K system, also provides a usable multicomponent silane foam system whence polymer foams having a high pore volume are obtainable.

A preferred embodiment of the alkoxysilane-terminated prepolymer according to the present invention, of the composition according to the present invention or of the multicomponent system according to the present invention comprises an active medical and/or cosmetic ingredient.

In the case of the multicomponent system, this active medical and/or cosmetic ingredient can be provided in component I) and/or II). It is likewise conceivable in this context for the active ingredient(s) to be provided in the form of a further, i.e. third or fourth, component and to be mixed with component I) and/or II) only immediately before application of the composition. Owing to the increasing complexity of the composition as the number of separate components increases, however, this route is generally only sensible when the active ingredients used are incompatible not only with component I) but also with component II).

The active ingredients can be in the form of pure active ingredient or alternatively in encapsulated form in order that, for example, a delayed time of release may be achieved.

Useful active cosmetic ingredients include particularly those having skin-caring properties, for example active moisture-promoting or skin-calming ingredients.

Useful active medical ingredients for the purposes of the present invention include a multiplicity of types and classes of active ingredients.

Such an active medical ingredient may comprise for example a component that releases nitrogen monoxide under in vivo conditions, preferably L-arginine or an L-arginine-containing or an L-arginine-releasing component, more preferably L-arginine hydrochloride. Proline, ornithine and/or other biogenic intermediates such as, for example, biogenic polyamines (spermine, spermitine, putrescine or bioactive artificial polyamines) can also be used. Components of this type are known to augment wound healing, while their continuous substantially uniform rate of release is particularly conducive to wound healing.

Further active ingredients usable according to the present invention comprise at least one substance selected from the group of vitamins or provitamins, carotenoides, analgesics, antiseptics, haemostyptics, antihistaminines, antimicrobial metals or salts thereof, plant-based wound healing promoter substances or substance mixtures, plant extracts, enzymes, growth factors, enzyme inhibitors and also combinations thereof.

Suitable analgesics are in particular non-steroidal analgesics especially salicylic acid, acetylsalicylic acid and its derivatives e.g. Aspirin®, aniline and its derivatives, acetaminophen e.g. Paracetamol®, anthranilic acid and its derivatives e.g. mefenamic acid, pyrazole or its derivatives e.g. methamizole, Novalgin®, phenazone, Antipyrin®, isopropylphenazone and most preferably arylacetic acids and derivatives thereof, heteroarylacetic acid and also derivatives thereof, arylpropionic acids and also derivatives thereof and heteroarylpropionic acids and also derivatives thereof e.g. Indometacin®, Diclofenac®, Ibuprofen®, Naxoprophen®, Indomethacin®, Ketoprofen®, Piroxicam®.

Suitable growth factors include in particular aFGF (Acidic Fibroplast Growth Factor), EGF (Epidermal Growth Factor), PDGF (Platelet Derived Growth Factor), rhPDGF-BB (Becaplermin), PDECGF (Platelet Derived Endothelial Cell Growth Factor), bFGF (Basic Fibroplast Growth Factor), TGF α; (Transforming Growth Factor alpha), TGF β (Transforming Growth Factor beta), KGF (Keratinocyte Growth Factor), IGF1/IGF2 (insulin-Like Growth Factor) and TNF (Tumor Necrosis Factor).

Suitable vitamins or provitamins are especially the fat-soluble or water-soluble vitamins vitamin A, group of retinoides, provitamin A, group of carotenoides, especially β-carotene, vitamin E, group of tocopherols, especially α-tocopherol, β-tocopherol, γ-tocopherol, δ-tocopherol and α-tocotrienol, β-tocotrienol, γ-tocotrienol and δ-tocotrienol, vitamin K, phylloquinone, especially phytomenadione or plant-based vitamin K, vitamin C, L-ascorbic acid, vitamin B1, thiamine, vitamin B2, riboflavin, vitamin G, vitamin B3, niacin, nicotinic acid and nicotinamide, vitamin B5, pantothenic acid, provitamin B5, panthenol or dexpanthenol, vitamin B6, vitamin B7, vitamin H, biotin, vitamin B9, folic acid and also combinations thereof.

A useful antiseptic is any antiseptic that has a germicidal bactericidal, bacteriostatic, fungicidal, virucidal, virustatic and/or generally microbicidal effect.

Antiseptics selected from the group resorcinol, iodine, iodine-povidone, chlorhexidine, benzalkonium chloride, benzoic acid, benzoyl peroxide or cetylpyridmium chloride are suitable in particular. In addition, antimicrobial metals in particular are useful as antiseptics. Useful antimicrobial metals include in particular silver, copper or zinc and also their salts, oxides or complexes in combination or alone.

Plant-based active wound healing promoter ingredients in the context of the present invention are in particular extracts of chamomile, hamamelis extracts e.g. *Hamameiis virgina, Calendula* extract, aloe extract e.g. *Aloe vera, Aloe barbadensis, Aloe feroxoder* or *Aloe vulgaris*, green tea extracts, seaweed extract e.g. red algae or green algae extract, avocado extract, myrrh extract e.g. *Commophora molmol*, bamboo extracts and also combinations thereof.

A particularly preferred embodiment of the alkoxysilane-terminated prepolymer according to the present invention, of the composition according to the present, invention or of the multicomponent system according to the present invention comprises at least an active medical ingredient particularly selected from substances that release nitrogen monoxide under in vivo conditions, and also substance selected from the group of vitamins or provitamins, carotenoids, analgesics, antiseptics, haemostyptics, antihistaminines, antimicrobial metals or salts thereof, plant-based wound healing promoter substances or substance mixtures, plant extracts, enzymes, growth factors, enzyme inhibitors and also combinations thereof.

The active-ingredient content depends in principle primarily on the medically required dose and also on the degree of compatibility with the remaining constituents of the composition or multicomponent system according to the present invention.

The alkoxysilane-terminated prepolymer of the present invention, the composition of the present invention or the multicomponent system of the present invention may also comprise further, auxiliary substances. Possibilities here include, for example, foam stabilizers, thixotroping agents, thickeners, antioxidants, photoprotectants, emulsifiers, plasticizers, pigments, fillers, pack-stabilizing additives, biocides, cosolvents, and/or flow control agents.

Alkylpolyglycosides for example are useful as foam stabilizers. They are obtainable in a conventional manner by reaction of comparatively long-chain monoalcohols with mono-, di- or polysaccharides (Kirk-Othmer Encyclopedia of Chemical Technology, John Wiley & Sons, Vol. 24, p. 29). The comparatively long-chain monoalcohols, which optionally may also be branched, preferably comprise an alkyl moiety of 4 to 22 carbon atoms, preferably 8 to 18 carbon atoms and more preferably 10 to 12 carbon atoms. Specific examples of comparatively long-chain monoalcohols are 1-butanol, 1-propanol, 1-hexanol, 1-octanol, 2-ethylhexanol, 1-decanol, 1-undecanol, 1-dodecanol (lauryl alcohol), 1-tetradecanol (myristyl alcohol) and 1-octadecanol (stearyl alcohol). It will be appreciated that mixtures of the comparatively long-chain monoalcohols mentioned can also be used.

These alkylpolyglycosides preferably have structures derived from glucose. Particular preference is given to using alkylpolyglycosides of formula (I).

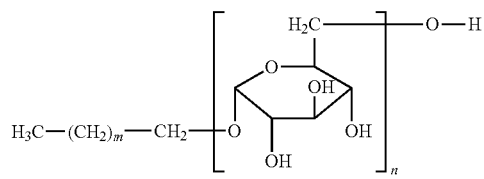

Formula (I)

m = 4 to 20
n = 1 or 2 m is preferably from 6 to 20 and more preferably from 10 to 16.

The alkylpolyglycosides preferably have an HLB value of less than 20, more preferably of less than 16 and most preferably of less than 14, the HLB value being computed using the formula HLB=20·Mh/M, where Mh is the molar mass of the hydrophilic portion of a molecule and M is the molar mass of the entire molecule (Griffin, W. C.: Classification of surface active agents by HLB, J. Soc. Cosmet. Chem. 1, 1949).

Further foam stabilizers include conventional anionic, cationic, amphoteric and nonionic surfactants and also mixtures thereof. Preference is given to using alkylpolyglycosides, EO-PO block copolymers, alkyl or aryl alkoxylates, siloxane alkoxylates, esters of sulphosuccinic acid and/or alkali or alkaline earth metal alkanoates. Particular preference is given to using EO-PO block copolymers.

In addition, to improve the foam properties of the resulting foam, conventional monohydric alcohols and also mixtures thereof can be used. These are monohydric alcohols, such as ethanol, propanol, butanol, deeanol, tridecanol, hexadecanol, and also monofunctional polyether alcohols and polyester alcohols.

These foam stabilizers can be added to component I) and/or preferably component II) in the case of the multicomponent system, provided no chemical reaction takes place with the respective components. The overall content of these components, based on the composition of the present invention or on the multicomponent system, is especially in the range from 0.1 to 20 wt % and preferably in the range from 1 to 10 wt %.

The alkoxysilane-terminated prepolymer of the present invention, the composition of the present invention or the multicomponent system of the present invention is useful for a multiplicity of applications. For instance, they are suitable for all fields of use wherefor predesignated polyurethane foams and also α/γ-silane foams are proposed in the prior art, i.e. for the building construction sector, to insulate pipes or else to fill cavities in machines.

The present invention further provides a shaped article obtainable by polymerizing an alkoxysilane-terminated prepolymer of the present invention, a composition of the present invention or a multicomponent system of the present invention.

In the former cases of alkoxysilane-terminated prepolymer according to the present invention or of a composition according to the present invention, the polymerization can take place by action of atmospheric humidity for example. In the case of a multicomponent system, it is preferable first to mix the components and then to subject the resulting mixture to complete polymerization. Complete polymerization of this mixture at room temperature preferably takes not more than five minutes, more preferably not more than three minutes and even more preferably not more than one minute. In the case of the one-component 1K compositions, the time to complete polymerization depends chiefly on the thickness of the exported layer.

Complete polymerization for the purposes of the present invention is to be understood as meaning more than just a skin having been formed on the outside; that is, more than that the outside surface of the shaped article is no longer tacky, but that the prepolymers have very largely undergone complete reaction. This is verified to be the case in the context of the present invention when the shaped article obtained is completely indented for some seconds with the finger and then automatically returns into the original state when the pressure of the finger is removed.

Rapid curing of this kind is advantageous in medical applications in particular, specifically for the use as a sprayable in situ-foamable wound dressing. This is because it is only the extremely rapid curing which makes it possible in the first place that the wound dressing can be promptly enclosed in a bandage and put under mechanical loading by the patient. Long waiting times can be avoided as a result.

It has likewise been determined that, surprisingly, in addition to these purposes, the alkoxysilane-terminated prepolymer of the present invention, the composition of the present invention or the multicomponent system of the present invention are also open to applications in the medical sector, since there is no need to use toxic or irritant compounds.

The medical field of use includes the provision of in-situ preparable wound dressings for example. For this, the alkoxysilane-terminated prepolymer of the present invention, the composition of the present invention or the multicomponent system of the present invention can be sprayed, or otherwise applied, as a 1K or 2K foam system of the predesignated kind onto skin injuries or injuries of some other kind. The foamed materials exhibit no marked adherence to organic tissue such as wound tissue for example, while their porous structure enables them to absorb wound secretions or blood. The reason for this appears to be that the alkoxysilane-terminated prepolymer of the present invention, the composition of the present invention or the multicomponent system of the present invention, when spray-dispensed under the aforementioned conditions, form an open porous structure, to some extent at least, and hence are absorbent.

The polarity of the alkoxysilane-terminated prepolymer of the present invention, of the composition of the present invention or of the multicomponent system of the present invention and of the foams obtainable therefrom is also of advantage for this purpose, especially in comparison with the prior art systems based on silane polymers having apolar side-chains. Thus, the hydrophilicity of the foam obtained can be modified as required, for example to exhibit better absorbance for aqueous fluids, such as blood or wound secretions, by varying the $CO_2$ content of the polyethercarbonatepolyol to adjust the polarity thereof.

The present invention further provides a shaped article which is in accordance with the present invention and which is obtainable by polymerizing and foaming an alkoxysilane-terminated prepolymer of the present invention, a composition of the present invention or a multicomponent system of the present invention, and is characterized in that the shaped article is a wound dressing.

A wound dressing of this kind has the advantage that the foam structure is not only capable of imbibing wound secretions, but simultaneously also of providing mechanical protection for the wound against knocks and the like. Even the pressure of garments on the wound is partially absorbed by the foam structure.

The sprayed wound dressing further conforms ideally to the usually irregular contours of a wound, thus ensuring a wound covering which is very largely free from pressure pain due to improper wound-dressing fit. In addition, the wound dressing obtained according to the present invention shortens the time needed for wound care compared with care using a traditional wound dressing, since there is no need for the time-consuming cutting to size and shape.

The present invention further provides a pressurized can containing an alkoxysilane-terminated prepolymer according to the invention, a composition according to the invention or a multicomponent system according to the invention, wherein the pressurized can is more particularly pressurized with a liquid blowing gas to a pressure of at least 1.5 bar. Useful blowing gases include particularly the pressure-liquefied alkanes and alkenes already more particularly specified above.

Preferably, moreover, the pressurized can need only be filled with sufficient blowing gas to correspond to the solubility of the blowing gas in the composition at fill pressure. The solubility can be determined via the above-described lack of phase separation after one hour.

The pressurized can may be more particularly constructed as a two- or generally as a multi-chamber pressurized can having an outlet valve and a mixing nozzle, in which ease component I) of the multicomponent system according to the present invention is in a first chamber of the two-chamber pressurized can and the second chamber contains component II), wherein the first or both of the chambers contain a liquefied blowing gas under superatmospheric pressure, especially a pressure of not less than 1.5 bar. The liquefied blowing gas in the two chambers can be the same or different.

In a further embodiment of the pressurized can according to the present invention, the blowing gases are soluble not only in component I) but also in component II), the solubility being not less than 3 wt % at a fill pressure of at least 1.5 bar and at a temperature of 20° C. and more particularly the amount of blowing gas introduced being not more than that which corresponds to the solubility. This ensures that the spray-dispensed foam is of consistent quality, since it is never the case that only blowing gas will escape from one of the chambers at the start of the spraying operation and hence the mixing ratio between components I) and II) will be nonoptimal. Multicomponent systems particularly suitable for this include one of the aforementioned thickeners and/or a polyurethane dispersion in component II).

There is a further advantage in that, owing to the solubility of the blowing gas in the chambers of the pressurized can, no phase separation comes about between component I)/II) and the blowing gas. Therefore, the blowing gas only escapes as the pressurized can is actuated and components I) and II) become mixed, and foams up this mixture in the process. The very rapid curing time of the multicomponent system according to the present invention has the effect that the foam structure produced by the blowing gas "freezes" and does not collapse in on itself.

The aforementioned effect is amplified by the use of a thickener of the aforementioned kind and/or of a polyurethane dispersion in component II), since both the thickener and the dispersion to some extent have stabilizing properties on the foam. A blowing gas solubility of not less than 3 wt % is advantageous to ensure sufficient foaming of the exported mixture. The blowing gas content is preferably from 10 to 40 wt % and more preferably from 15 to 30 wt % in the case of component I) and preferably from 3 to 20 wt % and more preferably from 5 to 15 wt % in the case of component II), all based on the resulting overall weight of the particular mixture. The amount of blowing gas introduced into the can and/or dissolved in the individual components can also be used to influence the foam structure. Thus, a higher quantity of blowing gas generally leads to a foam of lower density.

Even though providing the alkoxysilane-terminated prepolymer of the present invention, the composition of the present invention or the multicomponent system of the present invention in pressurized cans is a convenient option, however, the invention is not limited thereto. Thus, the alkoxysilane-terminating prepolymer of the present, invention, the composition of the present invention or the multicomponent system of the present invention is also readily usable in the form of a casting compound which is curable either in the air or on prior mixing with a protic solvent, such as water.

The present invention will now be more particularly elucidated with reference to exemplary embodiments:

EXAMPLES

General:

Any amounts, proportions and percentages hereinbelow are based, unless otherwise stated, on the weight and the overall amount, i.e. the overall weight, of the compositions.

Unless stated otherwise, analytical measurements all relate to measurements at temperature of 23° C.

Methods:

The proportion of incorporated $CO_2$ in the polyethercarbonatepolyols was determined using $^1H$ NMR (from Bruker, DPX 400, 400 MHz; pulse program zg30, wait time d1: 5 s, 100 scans). Each sample was dissolved in deuterated chloroform. Dimethyl terephthalate was added to the deuterated solvent as an internal standard at a rate of 2 mg per 2 g of $CDCl_3$. The relevant resonances in $^1H$ NMR (based on $CHCl_3$=7.24 ppm) are as follows: carbonate resulting from carbon dioxide incorporated in the polyethercarbonatepolyol (resonances at 5.2 to 4.8 ppm), unconverted PO resonance at 2.4 ppm, polyetherpolyol (i.e. without incorporated carbon dioxide) resonances at 1.2 to 1.0 ppm.

The molar fractions of carbonate incorporated in the polymer, of polyetherpolyol fractions and of unconverted PO is determined by integration of the corresponding signals.

Number-average molecular weight $M_n$ is determined as follows: First the polyol is admixed with acetic anhydride and pyridine. After the reaction has taken place, the OH number is experimentally determined in accordance with German standard specification DIN 53240-1 by subsequent back-titration of the resulting acetic acid with standard alcoholic potassium hydroxide solution. OH number is reported in mg of KOH per gram of polyol. Number-average molecular weight $M_n$ is calculated from the OH number using the formula number-average molecular weight $M_n$=56×1000×OH functionality/OH number.

NCO contents, unless expressly mentioned otherwise, were determined volumetrically in accordance with DIN-EN ISO 11909.

The check for free NCO groups was carried out using IR spectroscopy (band at 2260 cm$^{-1}$).

Reported viscosities were determined using rotary viscometry in accordance with German standard specification DIN 53019 at 23° C. with a rotary viscometer at a rotary frequency of 18 s$^{-1}$ from Anton Paar Germany GmbH, Ostfildern, DE.

The maximum soluble blowing gas quantity was determined at 20° C. in "test glasses for optical checks of aerosols" from Parnasol Willi Mäder AG, CH. The maximum soluble blowing gas quantity relates to the weight ratio of blowing gas to the substance/mixture to be investigated, and was reached as soon as the blowing gas just failed to form a second phase on a permanent basis (>1 h).

Since viscosity measurement under blowing gas conditions is technically not feasible, viscosities of STP/blowing gas solutions are estimated on the basis of the flow rate at a 5% gradient in test glasses by comparison with reference solutions of previously determined viscosity (aqueous solutions of different concentrations of Walocel CRT 30 G).

The mixtures were foamed up using a 2K spraying apparatus which was filled as described in WO 2012/022686 and WO 2012/022685.

Employed Substances and Abbreviations

HDI: hexamethylene 1,6-diisocyanate
Geniosil® XL 926: [(cyclohexylamino)methyl]triethoxysilane (Wacker Chemie AG, Munich, DE)
Walocel CRT 30 G: carboxymethylcellulose, sodium salt (Dow Deutschland Anlagengesellschaft mbH, Schwalbach, DE)
P/B 2.7: mixture of propane and isobutane to give a gas pressure of 2.7 bar at 20° C.
Polyethercarbonatepolyol 1: polyethercarbonatediol based on propylene oxide and $CO_2$, with an OH number of 58 mg KOH/g ($M_n$=1931 g/mol) and an incorporated $CO_2$ content of 15.1 wt % and an OH functionality of 2.
Polyethercarbonatepolyol 2: polyethercarbonatediol based on propylene oxide and $CO_2$, with an OH number of 55.5 mg KOH/g ($M_n$=2018 g/mol) and an incorporated $CO_2$ content of 18.2 wt % and an OH functionality of 2.

The examples which follow demonstrate the preparation of silane-terminated prepolymers and their use.

Example 1: Preparissg Prenolymer P1

A mixture of 800 g of polyethercarbonatepolyol 1 and 1.89 g of dibutyl phosphate was admixed at 60-65° C. with 1044.56 g of hexamethylene diisocyanate (HDI) added dropwise in the course of 15 mm. Thereafter, the mixture was stirred at 80° C. for 1.5 hours. The NCO content of this mixture was 25.9%.

Excess HDI was removed by thin-film distillation at 140° C. and 0.15 mbar to obtain a prepolymer having an NCO content of 3.74%.

Example 2: Preparing Prepolymer P2

A mixture of 251.41 g of hexamethylene diisocyanate and 0.45 g of dibutyl phosphate was admixed at 58-62° C. with 213.63 g of polyethercarbonatepolyol 2 added dropwise in the course of 45 min. Thereafter, the mixture was stirred at 80-82° C. for 1 hour. The NCO content of this mixture was 24.9%.

Excess HDI was removed by thin-film distillation at 120° C. and 0.03 mbar to obtain a prepolymer having an NCO content of 3.51%.

Example 3: Preparation of Prepolymer P3

A mixture of 1032 g of a polyalkylene oxide having a molar mass of 4000 g/mol started on 1,2-propylene glycol, and having an ethylene oxide weight fraction of 13% and a propylene oxide weight fraction of 86%, dried beforehand at 80° C. at a pressure of 0.1 mbar for 1 h, and 1.8 g of benzoyl chloride was added dropwise in the course of 30 minutes at 80° C. with 650 g of HDI, and subsequently stirred for 4 h. Excess HDI was removed by thin-film distillation at 130° C. and 0.03 mbar to obtain a prepolymer having an NCO content of 1.82%.

Example 4: Preparation of Prepolymer P4

A mixture of 246.7 g of a polyalkylene oxide having a molar mass of 4000 g/mol started on 1,2-propylene glycol, and having an ethylene oxide weight fraction of 30% and a propylene oxide weight fraction of 70%, dried beforehand at 80° C. at a pressure of 0.1 mbar for 1 h, and 0.43 g of benzoyl chloride was added dropwise in the course of 20 minutes at 80° C. with 155.2 g of HDI, and subsequently stirred for 3 h at 80° C. Excess HDI was removed by thin-film distillation at 140° C. and 0.03 mbar to obtain a prepolymer having an NCO content of 1.88%.

Example 5: Preparation of Prepolymer P5

Desmophen C 2200 (polycarbonatediol formed from dimethyl carbonate and 1,6-hexanediol, $M_n$=2000 g/mol), previously dewatered at 100° C. and a pressure of 0.2 mbar for 1 h, and gradually melted at 60° C. was added to 500.0 g of hexamethylene diisocyanate and 0.90 g of isophthaloyl dichloride. This was followed by stirring at 60° C. for one hour, the NCO value of the reaction mixture was 26.4%. Excess HDI was distilled off at a temperature of 140° C.-150° C. in a kugelrohr distillation apparatus. The residue which remained (residual NCO value 3.7%), consisting of the desired prepolymer, solidified at room temperature.

Example 6: Preparation of Silane-Terminated Prepolymer STP1 (Inventive)

150 g of prepolymer P1 were admixed at 30° C. with 36.41 g of Geniosil XL 926 in the course of 15 min. The reaction was slightly exothermic, the temperature rose to a maximum of 47° C. Following a further 2 hours of stirring at 30-40° C., complete conversion into the silane-terminated prepolymer (STP) was evidenced by IR spectroscopy.

Example 7: Preparation of Silane-Terminated Prepolymer STP2 (Inventive)

100 g of prepolymer P2 were admixed at 40-50° C. with 23.0 g of Geniosil XL 926 in the course of 15 min. The reaction was slightly exothermic, the temperature rose to a maximum of 50° C. Following a further hour of stirring at 40-50° C., complete conversion into the silane-terminated prepolymer (STP) was evidenced by IR spectroscopy.

Example 8: Preparation of Silane-Terminated Prepolymer STP3 (Inventive)

A mixture of 50 g of prepolymer P2 and 50 g of prepolymer P3 was admixed at 40-50° C. with 18.24 g of Geniosil XL 926 in the course of 15 mm. The reaction was slightly exothermic, the temperature rose to a maximum of 50° C. Following a further one hour of stirring at 40-50° C., complete conversion into the silane-terminated prepolymer (STP) was evidenced by IR spectroscopy.

Example 9: Preparation of Silane-Terminated Prepolymer STP4 (Inventive)

90 g of prepolymer P1 and 10 g of prepolymer P3 were admixed at 30° C. with 22.96 g of Geniosil XL 926 in the course of 15 min. Following a further one hour of stirring at 30-40° C., complete conversion into the silane-terminated prepolymer (STP) was evidenced by IR spectroscopy.

Example 10: Preparation of Silane-Terminated Prepolymer STP5 (Inventive)

90 g of prepolymer P1, 10 g of prepolymer P3 and 10.67 g of prepolymer P4 were admixed at 30° C. with 23.81 g of Geniosil XL 926 in the course of 15 min. Following a further one hour of stirring at 30-40° C., complete conversion into the silane-terminated prepolymer (STP) was evidenced by IR spectroscopy.

Example 11: Preparation of Silane-Terminated Prepolymer STP6 (Inventive)

8.0 g of prepolymer P5 were weighed at 40-50° C., as a viscose liquid, in a small glass tube and admixed with 2.0 g of Geniosil XL 926. The reaction was slightly exothermic, and after the reaction had ended a very pronounced increase in the viscosity was noted. The silane-terminated prepolymer obtained turned solid on cooling down to RT.

Blowing gas compatibility was investigated in "test glasses for optical checks of aerosols" from Pamasol Willi Mäder AG, CH. About 500 mg of this silane-terminated prepolymer STP6 were introduced into the small tube and admixed under superatmospheric pressure with the blowing gases isobutane/propane and dimethyl ether. Neither blowing gas had sufficient solubility for the prepolymer. A spray test to produce a new foam based on Desmophen C 2200 as described in the other examples is accordingly impossible.

Example 12: Foaming of STP1 (Inventive Use)

12.4 g of STP1 were dissolved in 3.3 g of P/B 2.7. A phosphate buffer was used as second component. To prepare it, 9.078 g of $KH_2PO_4$ were dissolved in 1 L of water, while 11.876 g of $Na_2HPO_4$ were dissolved in 1 L of water to prepare the second solution. 150 mL of the $Na_2HPO_4$ solution were made up to 1000 mL with the $KH_2PO_4$ solution. The pH of this phosphate buffer was 6.1, the buffer concentration of this solution was 0.069 mol/l. This buffer solution was adjusted with Walocel CRT 30 G to a viscosity of about 500 mPas.

The two components were separately introduced into their own chamber in a 2K spraying apparatus operated using compressed air, the chambers in the spraying apparatus being in a volume ratio of 2.5 (STP) to 1 (buffer solution) relative to each other. Synchronous discharge of the two components in this volume ratio is ensured by the design, and proceeded via a static mixer where the commixing took place. A completely cured foam was obtained after 20 minutes.

Example 13: Foaming of STP1 (Inventive Use)

12.1 g of STP1 were dissolved in 3.2 g of P/B 2.7. The second component was a mixture of a succinic acid buffer and glycerol. It was prepared by making up 23.62 g of succinic acid to 1000 mL with water, 25 mL of this solution were mixed with 25 mL of 0.1 M aqueous sodium hydroxide solution and made up to 1000 mL with water and adjusted with Walocel CRT 30 G to a viscosity of about 500 mPas. The pH of this buffer was 4.0, the concentration of the buffer was 0.05 mol/l. 60 mL of this buffer solution were mixed with 40 mL of the glycerol solution.

The two components were separately introduced into their own chamber in a 2K spraying apparatus operated using compressed air, the chambers in the spraying apparatus being in a volume ratio of 2.5 (STP) to 1 (buffer solution) relative to each other. Synchronous discharge of the two components in this volume ratio is ensured by the design, and proceeded via a static mixer where the commixing took place. A completely cured foam was obtained after 40 seconds.

Example 14: Foaming of STP4 (Inventive Use)

11.7 g of STP4 were dissolved in 3.1 g of P/B 2.7. A phosphate buffer was used as second component. To prepare it, 9.078 g of $KH_2PO_4$ were dissolved in 1 L of water, while 11.876 g of $Na_2HPO_4$ were dissolved in 1 L of water to prepare the second solution. 150 mL of the $Na_2HPO_4$ solution were made up to 1000 mL with the $KH_2PO_4$ solution. The pH of this phosphate buffer was 6.1, the buffer concentration of this solution was 0.069 mol/l. This buffer solution was adjusted with Walocel CRT 30 G to a viscosity of about 500 mPas.

The two components were separately introduced into their own chamber in a 2K spraying apparatus operated using compressed air, the chambers in the spraying apparatus being in a volume ratio of 2.5 (STP) to 1 (buffer solution) relative to each other. Synchronous discharge of the two components in this volume ratio is ensured by the design, and proceeded via a static mixer where the commixing took place. A completely cured foam was obtained after 2 minutes.

Example 15: Foaming of STP5 (Inventive Use)

12.3 g of STP5 were dissolved in 2.5 g of P/B 2.7. A phosphate buffer was used as second component. To prepare it, 9.078 g of $KH_2PO_4$ were dissolved in 1 L of water, while 11.876 g of $Na_2HPO_4$ were dissolved in 1 L of water to prepare the second solution. 150 mL of the $Na_2HPO_4$ solution were made up to 1000 mL with the $KH_2PO_4$ solution. The pH of this phosphate buffer was 6.1, the buffer concentration of this solution was 0.066 mol/l. This buffer solution was adjusted with Walocel CRT 30 G to a viscosity of about 500 mPas.

The two components were separately introduced into their own chamber in a 2K spraying apparatus operated using compressed air, the chambers in the spraying apparatus being in a volume ratio of 2.5 (STP) to 1 (buffer solution)

relative to each other. Synchronous discharge of the two components in this volume ratio is ensured by the design, and proceeded via a static mixer where the commixing took place. A completely cured foam was obtained after 2 minutes.

Example 16: Foaming STP2 (Inventive Use)

12.1 g of STP2 were dissolved in 3.2 g of P/B 2.7. The second component was a mixture of a succinic acid buffer and glycerol. It was prepared by making up 1.18 g of succinic acid to 60 g with water and with 40 g of 0.1 M NaOH. The resulting buffer solution was adjusted with Walocel CRT 30 G to a viscosity of about 500 mPas. The pH of this buffer solution was 4.0, the concentration of the buffer mixture was 0.1 mol/1.50 mL of this buffer solution were mixed with 50 mL of glycerol.

The two components were separately introduced into their own chamber in a 2K spraying apparatus operated using compressed air, the chambers in the spraying apparatus being in a volume ratio of 2.5 (STP) to 1 (buffer solution) relative to each other. Synchronous discharge of the two components in this volume ratio is ensured by the design, and proceeded via a static mixer where the commixing took place. A completely cured foam was obtained after 1.5 minutes.

Example 17: Foaming of STP3 (Inventive Use)

11.9 g of STP3 were dissolved in 3.4 g of P/B 2.7. The second component was a mixture of a succinic acid buffer and glycerol. It was prepared by dissolving 1.18 g of succinic acid in 60 g of water and mixed with 40 g 0.1 M NaOH. The pH of this buffer solution was 4.0, the concentration of the buffer mixture was 0.1 mol/l. The buffer solution obtained was adjusted with Walocel CRT 30 G to a viscosity of about 500 mPas. 50 mL of this buffer solution were mixed with 50 mL of glycerol.

The two components were separately introduced into their own chamber in a 2K spraying apparatus operated using compressed air, the chambers in the spraying apparatus being in a volume ratio of 2.5 (STP) to 1 (buffer solution) relative to each other. Synchronous discharge of the two components in this volume ratio is ensured by the design, and proceeded via a static mixer where the commixing took place. A completely cured foam was obtained after 1.5 minutes.

Example 18: Foaming of STP3 (Inventive Use)

12.0 g of STP2 were dissolved in 3.4 g of P/B 2.7. A phosphate buffer was used as second component. To prepare it, 9.078 g of $KH_2PO_4$ were dissolved in 1 L of water, while 11.876 g of $Na_2HPO_4$ were dissolved in 1 L of water to prepare the second solution. 150 mL of the $Na_2HPO_4$ solution were made up to 1000 mL with the $KH_2PO_4$ solution. The pH of this phosphate buffer was 6.1, the buffer concentration of this solution was 0.069 mol/l. This buffer solution was adjusted with Walocel CRT 30 G to a viscosity of about 500 mPas.

The two components were separately introduced into their own chamber in a 2K spraying apparatus operated using compressed air, the chambers in the spraying apparatus being in a volume ratio of 2.5 (STP) to 1 (buffer solution) relative to each other. Synchronous discharge of the two components in this volume ratio is ensured by the design, and proceeded via a static mixer where the commixing took place. A completely cured foam was obtained after 2.5 minutes.

The invention claimed is:

1. An alkoxysilane-terminated prepolymer, obtained by reacting at least
   A) a polyol,
   B) a compound having two or more isocyanate groups, and
   C) an alkoxysilane having at least an isocyanate group or an isocyanate-reactive group,
   wherein the polyol A) comprises at least a polyethercarbonatepolyol obtained by addition of carbon dioxide and alkylene oxides onto H-functional starter molecules.

2. The alkoxysilane-terminated prepolymer according to claim 1, wherein the polyethercarbonatepolyol has a number-average molecular weight $M_n$ of ≥500 and ≤6000 g/mol.

3. The alkoxysilane-terminated prepolymer according to claim 1, wherein the polyethercarbonatepolyol has a content of carbonate groups, reckoned as $CO_2$, of ≥3 and ≤35 wt. %.

4. The alkoxysilane-terminated prepolymer according to claim 1, wherein the polyethercarbonatepolyol is obtained by addition of carbon dioxide and alkylene oxides onto H-functional starter molecules while using multimetal cyanide catalysts.

5. The alkoxysilane-terminated prepolymer according to claim 1, wherein the polyethercarbonatepolyol has ≥2 and ≤4 OH groups.

6. The alkoxysilane-terminated prepolymer according to claim 1, wherein the proportion of component A) which is attributable to the polyethercarbonatepolyol is ≥50 and ≤100 wt. %.

7. The alkoxysilane-terminated prepolymer according to claim 1, wherein the alkoxysilane of component C) is an α-alkoxysilane.

8. The alkoxysilane-terminated prepolymer according to claim 1, wherein component B) is an aliphatic and/or cycloaliphatic compound.

9. The alkoxysilane-terminated prepolymer according to claim 1, wherein the alkoxysilane-terminated prepolymer is obtained by reaction of at least the alkoxysilane C), comprising isocyanate-reactive groups, with an NCO-terminated polyurethane prepolymer, wherein the NCO-terminated polyurethane prepolymer is obtained by reaction of at least the isocyanate-functional compound B) with the polyol A).

10. A process for preparing the alkoxysilane-terminated prepolymer according to claim 1 comprising the steps of:
    reacting the polyol A) with the compound B) to form an NCO- or OH-terminated polyurethane prepolymer, and
    reacting the NCO- or OH-terminated polyurethane prepolymer with the alkoxysilane C) to form the alkoxysilane-terminated prepolymer.

11. A composition comprising at least an alkoxysilane-terminated prepolymer i) according to claim 1 and at least one further component.

12. The composition according to claim 11, wherein the further component is ≥1 and ≤70 wt. % of an alkoxysilane-terminated prepolymer other than i), which comprises a polyetherpolyol and/or a polyesterpolyol having a number-average molecular weight $M_n$ of ≥500 and ≤7000 g/mol as polyol component A).

13. The alkoxysilane-terminated prepolymer according to claim 1, wherein the polyethercarbonatepolyol has a content of carbonate groups, reckoned as $CO_2$, of ≥10 and ≤28 wt. %.

14. The alkoxysilane-terminated prepolymer according to claim 13, wherein the polyethercarbonatepolyol has a number-average molecular weight $M_n$ of ≥1000 and ≤3000 g/mol, wherein the polyethercarbonatepolyol has 2 OH groups, wherein the alkoxysilane of component C) is an α-alkoxysilane and wherein component B) is an aliphatic and/or cycloaliphatic compound.

* * * * *